United States Patent [19]

Lian et al.

[11] Patent Number: 5,585,208

[45] Date of Patent: Dec. 17, 1996

[54] ALKALINE GEL ELECTROLYTE FOR ELECTROCHEMICAL CELLS

[76] Inventors: Keryn K. Lian, 2100 Valencia Dr., Northbrook, Ill. 60062; Changming Li, 135 Royal Oak Dr., Vernon Hills, Ill. 60061; Richard H. Jung, 1016 N. Knight, Park Ridge, Ill. 60068; Lillian C. Thompson, 1114 Johnson Dr., Buffalo Grove, Ill. 60089

[21] Appl. No.: 513,377

[22] Filed: Aug. 10, 1995

[51] Int. Cl.$^6$ .................................................. H01M 6/14
[52] U.S. Cl. ...................... 429/190; 429/191; 429/194; 429/195; 429/206; 429/207; 429/218; 429/221; 429/229; 429/232; 429/223; 429/247; 429/104; 429/105; 429/107; 252/62.2; 252/500
[58] Field of Search .................... 252/62.2, 500; 429/190, 191, 194, 195, 206, 207, 218, 221, 229, 232, 223, 247, 104, 105, 107

[56] References Cited

U.S. PATENT DOCUMENTS

| | | | |
|---|---|---|---|
| 4,307,084 | 12/1981 | Drabick et al. | 424/180 |
| 4,500,667 | 2/1985 | Polak et al. | 524/406 |
| 4,605,603 | 8/1986 | Kanda et al. | 429/101 |
| 4,705,545 | 11/1987 | Polak et al. | 55/158 |
| 4,824,528 | 4/1989 | Polak et al. | 204/1 T |
| 5,030,527 | 7/1991 | Carpio et al. | 429/192 |

Primary Examiner—Bruce F. Bell
Attorney, Agent, or Firm—Kenneth M. Massaroni

[57] ABSTRACT

An alkaline gel electrolyte for an electrochemical cell is based on a polymeric binder of polyvinyl alcohol or polyvinyl acetate. Potassium hydroxide and/or sodium hydroxide is blended into the polymeric binder or matrix, and the resulting solution is used to cast a film that is useful as a gel electrolyte. The hydroxide in the solution is between about 1% to 25% by weight, and the polymer concentration is between about 0.5% to 10% by weight. The resulting gel electrolyte film contains between 10 to 90% water by weight. A nickel or iron porphine modifier may be added in an amount between about 1 to 1000 parts per million. The alkaline gel electrolyte is useful in combination with asymmetric inorganic electrodes to make electrochemical cells, and can also function as a separator. Improved power density and higher cycle life is achieved with the gel electrolyte.

17 Claims, 4 Drawing Sheets

ALKALINE GEL ELECTROLYTE FOR ELECTROCHEMICAL CELLS

TECHNICAL FIELD

This invention relates in general to electrolytes for electrochemical cells.

BACKGROUND

Energy generation and storage has long been a subject of study and development. Of special import is the storage of electrical energy in a compact form that can be easily charged and discharged, such as rechargeable batteries and/or electrochemical capacitors. High power, especially high current pulse, rechargeable electrochemical storage devices are very important in applications using electrical pulses such as communications and power tools. In these devices, high electrochemical kinetic rate, long cycle life of the electrode, and good ionic conductivity of the electrolyte are extremely important.

Most high-power electrochemical energy storage devices utilize aqueous electrolytes, since the aqueous electrolytes are known to have the highest ionic conductivity. However, aqueous electrolytes also result in problems when handling and packaging the devices. Furthermore, some good high-power electrochemical energy storage devices such as nickel/zinc (Ni-Zn), and silver/zinc (Ag-Zn) batteries do not have good cycle life due to dendrite growth on the zinc anode. The growth of dendrites on the zinc anode causes short circuits that significantly reduce the cycle life of the battery and is a severe limitation of the conventional art.

Since a zinc anode can provide a very negative anodic potential compared to other materials, it would be highly desirable to provide an electrochemical energy storage device utilizing zinc anodes that did not suffer from the poor cycle life due to dendritic growth. Elimination of this phenomena would enable one to create a device having increased charged storage capacity, thus further enabling the miniaturization of energy storage devices.

DETAILED DESCRIPTION OF THE PREFERRED EMBODIMENT

Figure 1:
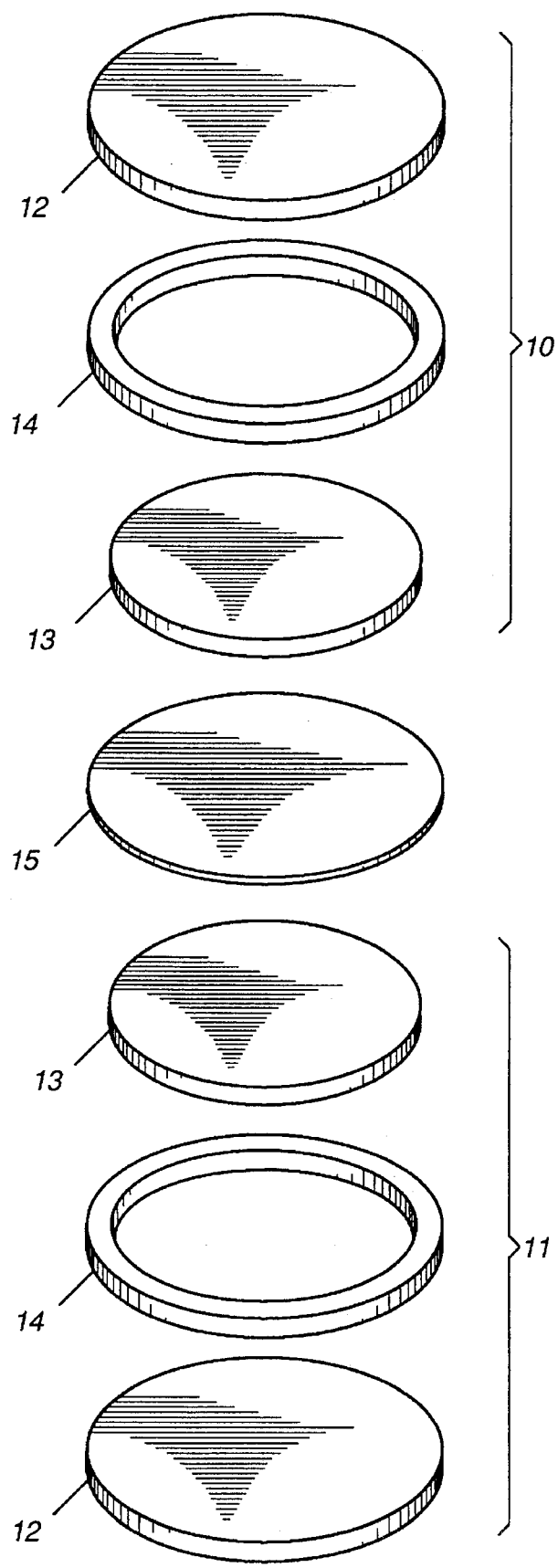
FIG. 1 is an exploded view of an electrochemical energy storage device in accordance with the invention.

A new type of polymer gel electrolyte has been developed. When combined with the proper electrode systems, the polymer gel electrolyte may be used to produce energy storage devices with very high power density. Furthermore, due to the unique properties of the polymer gel electrolyte, the cycle life of zinc electrodes has been significantly increased.

While the specification concludes with claims defining the features of the invention that are regarded as novel, it is believed that the invention will be better understood from a consideration of the following description in conjunction with the drawing figures, in which like reference numerals are carried forward. In the preferred embodiment of the invention, a polymer gel electrolyte is made from a polyvinyl resin and potassium hydroxide or sodium hydroxide. Polyvinyl resins are those polymeric materials generally considered to include polymers derived from monomers having the structure

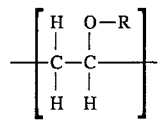

in which R represents hydrogen, alkyl, halogen or other groups. Many of the monomers can be prepared by addition of the appropriate compound to acetylene. The properties vary with chemical structure, crystallinity, and molecular weight. Polyvinyl alcohol is a tough, whitish polymer which can be formed into strong films, tubes and fibers that are highly resistant to hydrocarbon solvents. Although PVA is one of the few water soluble polymers, it can be rendered insoluble in water by the use of crosslinking agents. Two groups of products are available, those formed by the essentially complete hydrolysis of polyvinyl acetate, and those formed by incomplete hydrolysis. The former may be plasticized with water or glycols and molded or extruded into films, tubes, and filaments which are resistant to hydrocarbons. Polyvinyl acetate is a leathery, colorless thermoplastic material which softens at relatively low temperatures and which is relatively stable to light and oxygen. These polymers are clear and noncrystalline, and the chief applications are as adhesives and binders for water-based paints.

Prior art mixtures of PVA with phosphoric acid ($H_3PO_4$) have been known to produce membranes useful for use in gas separation technology. For example, U.S. Pat. No. 4,500,667 by Polak, et al., incorporated herein by reference, describes gas permeable PVA/$H_3PO_4$ films and methods of preparing the same. The polymer electrolyte of the preferred embodiment was made from 99% hydrolyzed polyvinyl alcohol (PVA) using sodium hydroxide (NaOH) or potassium hydroxide (KOH). In addition to sodium and potassium hydroxides, other alkaline hydroxides may also be used to form the electrolyte. For example, materials such as ammonium hydroxide, lithium hydroxide, cesium hydroxide, beryllium hydroxide, magnesium hydroxide, calcium hydroxide, strontium hydroxide and barium hydroxide may be used. Polyvinyl acetate may also be used as an alternate material for the electrolyte. The alkaline PVA gel electrolyte of the instant invention was prepared by first making an aqueous solution of PVA at a concentration range of 1–20% PVA by weight. The optimum range was found to be 5–10% by weight. The PVA is added to water heated to a temperature of between 50° C. and 100° C., and is stirred until all the PVA is dissolved. PVA is commercially available in a wide range of molecular weights, and it has been found that PVA obtained from Aldrich Chemical in the range of 80,000–140,000 molecular weight is a preferred material. Other molecular weights in the range of 30,000–50,000 or 50,000–80,000 are also useful, and materials with even higher molecular weights may also find use. However, higher molecular weights become more difficult to dissolve and provide a lower level of hydrogen bonding between the KOH and the hydroxyl group in the polymer backbone. In determining the optimum molecular weight for the polymer material, it should be noted that higher molecular weights are desirable when making an electrolyte that will be a stand-alone electrolyte, and that lower electrolyte weights of the polymer are desirable when the electrolyte is intended to be impregnated with other materials. Those skilled in the art of polymer science will realize that higher molecular weight polymers tend to be more structurally sound, whereas lower molecular weight polymers tend to be less rigid and more flexible.

Once the PVA solution has been made uniform, it is mixed in equal portions with a solution of potassium hydroxide (30% KOH by weight). For example, ten milliliters of the 15% PVA solution is mixed with ten milliliters of the 30% KOH solution to form the gel electrolyte. The optimum method of mixing is to add the KOH dropwise into the PVA solution with stirring to form a homogenous solution. A polymer gel electrolyte formed in this fashion results in a material that is useful to cast a film with good film integrity and good conductivity. The film is cast in a conventional manner and is left to dry until enough water is evaporated to produce a film of reasonable integrity. This can be done at room temperature for 20–30 minutes, or the cast film can be dried in an oven at 50°–80° C. for a shorter duration. The optimum drying conditions are, of course, a function of film thickness and initial solids content.

The reader will no doubt realize that variations on these ratios will produce electrolytes of somewhat different physical and electrical properties and, depending upon the desired properties of the final gel electrolyte, the amount of PVA, water and hydroxide may each be varied to suit the individual needs. Generally speaking, it has been found that the polymer, water, and hydroxide proportions in the PVA/KOH solution should be between 1% and 15% for the polymer, 60% and 98% for the water, and 1% and 25% for the potassium hydroxide, each presented in weight percent. When the solution is dried into a film or gel, the amount of water will be significantly reduced, typically by about 50%, thus proportionally changing the content of each of above constituents. The reader skilled in the art will readily understand that the exact percentage of each constituent will be a function of the drying conditions, and will vary from the above-stated percentages. Generally, the polymer matrix comprises 0.5% to 10% by weight of the electrolyte system, and the metal hydroxide comprises between 1% and 25% by weight. A metal porphine modifier, if used, is typically present between 1 and 1000 parts per million.

Having thusly prepared the polymer gel electrolyte, an electrical energy storage device was then made in order to test the efficacy of the instant invention. Referring now to FIG. 1, an energy storage device, such as an electrochemical cell, is made from a pair of asymmetric electrode assemblies 10 and 11. As used herein, the term 'asymmetric electrodes' means that the two electrodes are not the same composition, i.e. they are made from different materials. Examples of some asymmetric electrodes will be shown later in the specification, and are not intended to limit the scope of the claims, but are simply presented by way for example. Each electrode assembly may include a current collector 12 which is electrically conducting. The current collector 12 is preferably chemically inert to the alkaline gel electrolyte 15. A housing or gasket 14 may be employed to house the electrodes and the electrolyte, but is optional. Because the gel electrolyte 15 is in the form of a film, it can also serve as a separator between the two electrodes 10 and 11, thereby affording free and unobstructed movement to the ions in the electrolyte. The combination gel electrolyte/separator prevents contact between the opposing electrodes 13, since such a condition would result in a short circuit and malfunction of the cell. The gel electrolyte may also be used in conjunction with a conventional separator, and in this embodiment, is impregnated into a porous separator. Materials useful for a porous separator are well known to those skilled in the art, including porous versions of polymers such as polyvinylchloride, polypropylene, and cellulose acetate, filter paper, felt, and other types of similar materials. The separator is typically saturated with the electrolyte while the electrolyte is still in the liquid form.

The following examples will serve to illustrate some applications of the instant invention.

EXAMPLE 1

Figure 2:
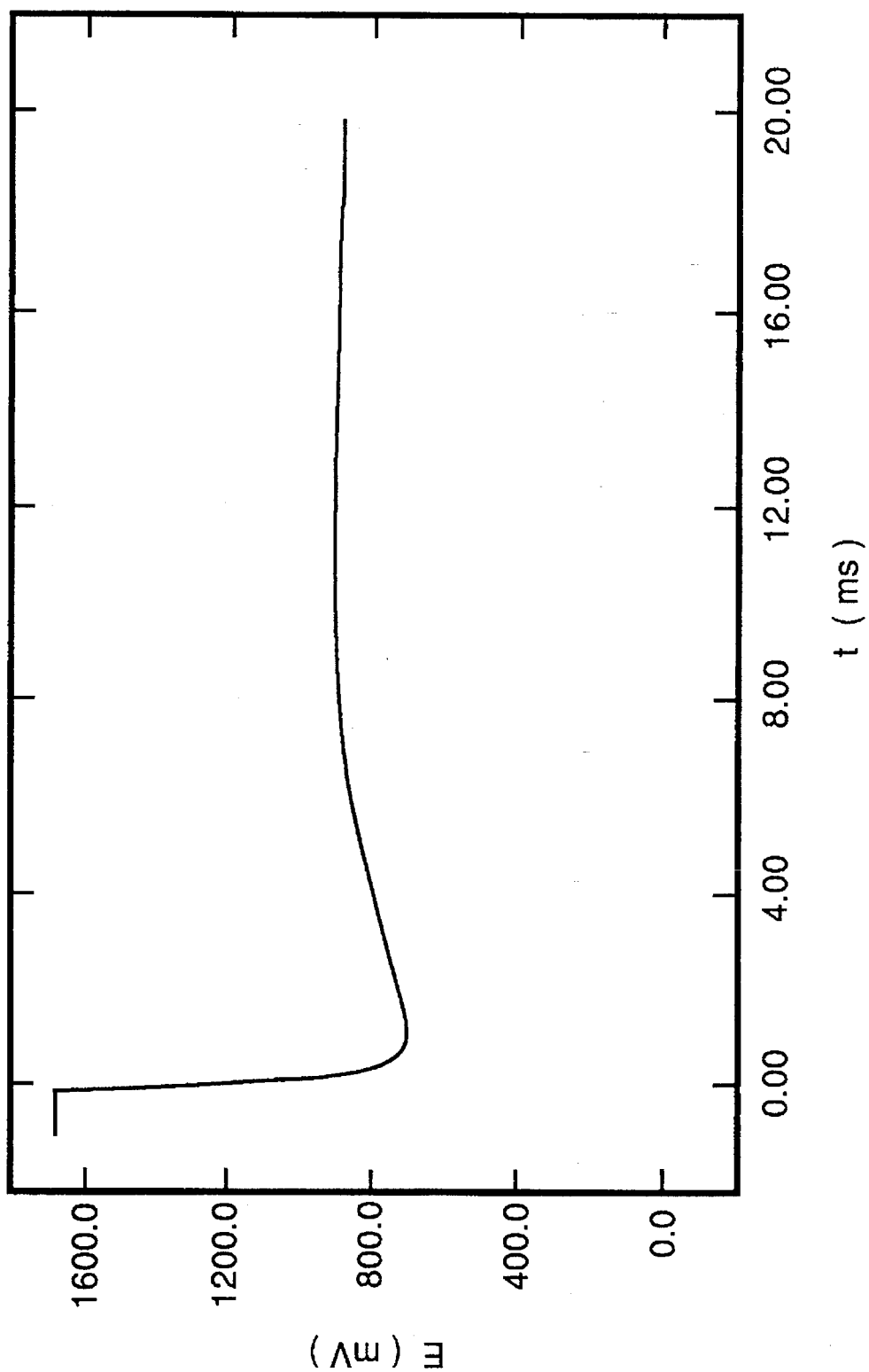
FIG. 2 is a discharge curve for a cell made with an alkaline gel electrolyte, zinc anode and a nickel/molybdenum/chromium alloy cathode.

An electrical energy storage device was assembled using a PVA/NaOH gel electrolyte. The anode of the cell was a zinc metal foil and the cathode of the cell was a foil of nickel/molybdenum/chrome alloy (known as HASTEALLOY C22™). A sandwich of the cathode film, the gel electrolyte and the anode was formed in order to create a thin film cell. The edges of the cell were then sealed with epoxy, and an electrical connection was made to the two electrodes. The resulting cell had an open circuit potential of about 1.65 volts. Referring now to FIG. 2, the constant current (100 milliamperes/cm$^2$) discharge curve shows a flat discharge profile at approximately 1.5 volts. This device was repeatedly charged and discharged at a 60% depth-of-discharge (DOD) for over 27,000 cycles with virtually no deterioration. This result is very significant since it shows that a greatly enhanced cycle life can be obtained when zinc electrodes are coupled with an alkaline polymer gel electrolyte. As previously discussed, conventional cells made with zinc anodes are known to have poor life cycling due to the formation of dendrites on the anode surface. Compared to prior art cells, this cell showed an increase of approximately one order of magnitude in cycle life duration.

EXAMPLE 2

Figure 3:
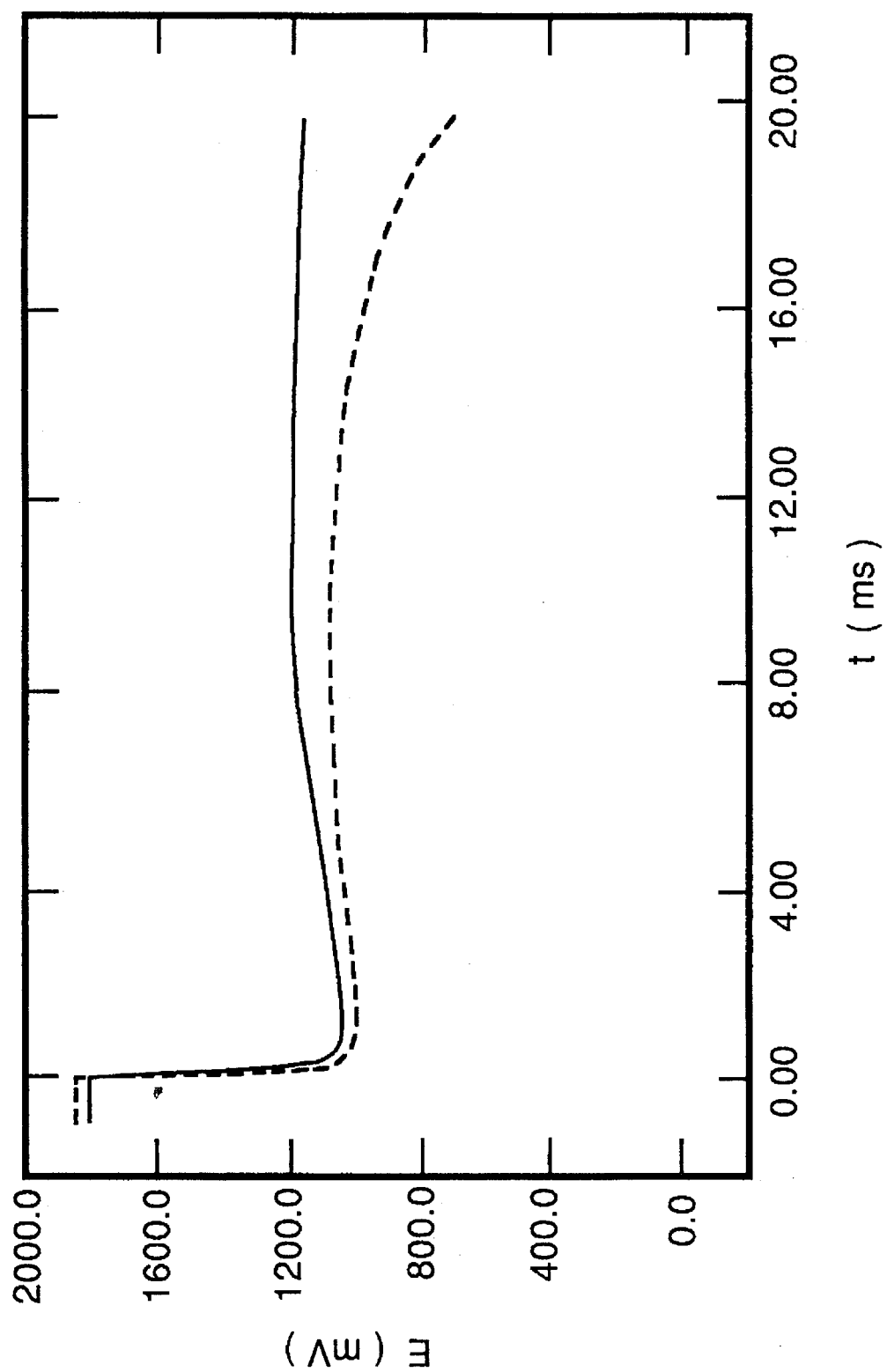
FIG. 3 is a discharge curve for a cell made with an alkaline gel electrolyte, zinc anode and silver cathode.

Another cell was made in a fashion similar to that of Example 1, except that the electrolyte for the cell was the PVA/KOH gel electrolyte and the cathode was a silver foil. The silver foil electrode was pre-activated to form an oxide layer by immersing the foil in concentrated hydrogen peroxide. After assembly, the cell had an open circuit voltage of approximately 1.4 volts and was cycled at a rate of up to 20 volts/second, suggesting a device that exhibits very high power density. The internal volume of the cell was approximately 0.035 cm$^3$ and it delivered a current of approximately 600 milliamperes at 1.05 volts. (See FIG. 3) This equates to a power density level of 18 kilowatts/L.

EXAMPLE 3

Figure 4:
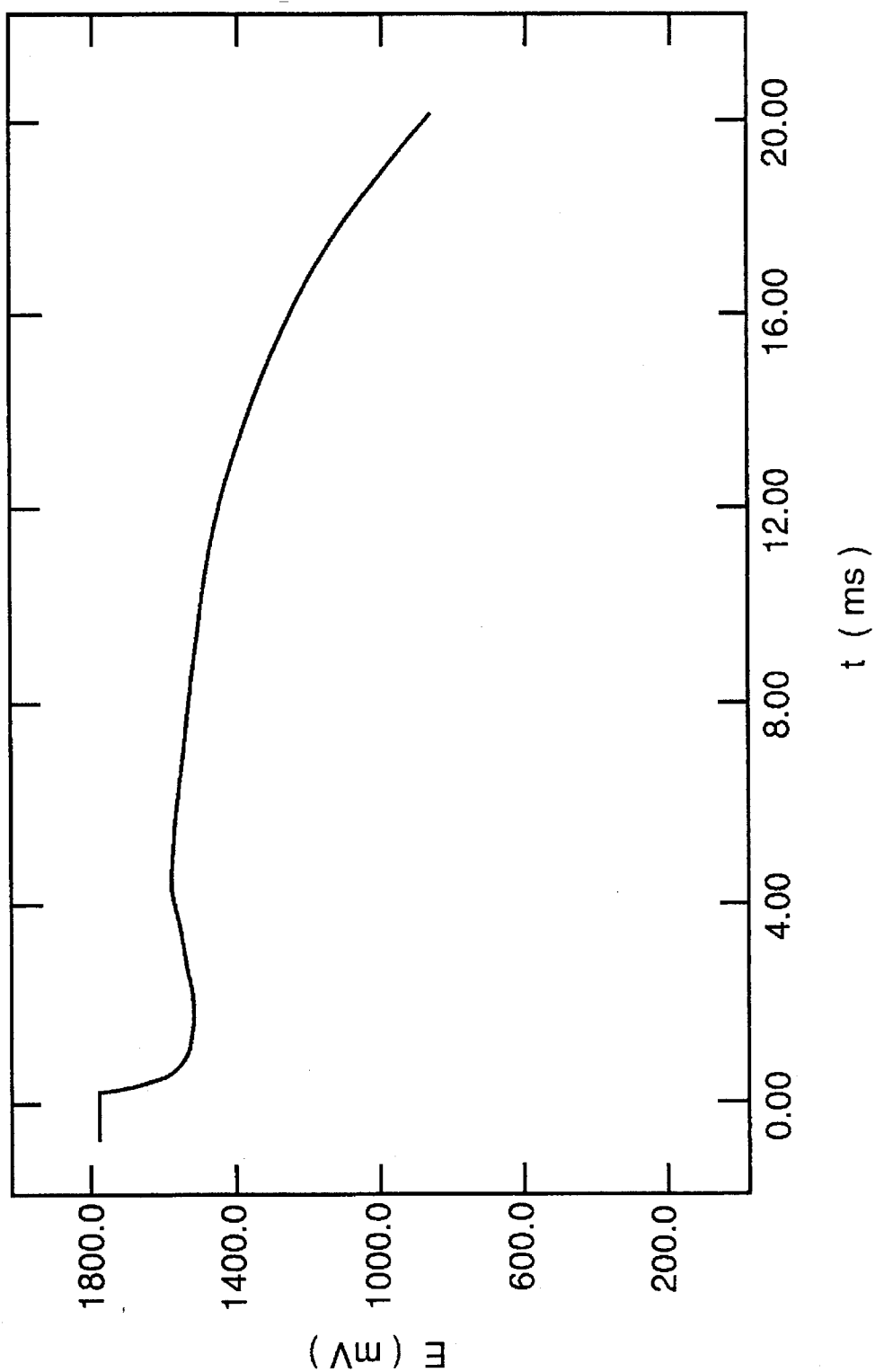
FIG. 4 is a discharge curve for a cell made with an alkaline gel electrolyte, zinc anode and silver filled epoxy/copper foil cathode.

Another cell was made in the fashion similar to Example 2 (the electrolyte used in the cell was PVA/KOH); however, this time the cathode was a thin copper foil coated with silver-filled epoxy. The surface of the epoxy was etched in an oxygen plasma. No other chemical pretreatment of the electrodes was used. This cell also showed a very fast voltage sweep rate, up to twenty volts/second, and delivered a current of approximately 900 milliamperes/cm$^2$ at 0.9 volts. (See FIG. 4) This is equivalent to a power density of over 20 kilowatts/L.

In summary, alkaline polymer gel electrolytes have been developed and found useful to couple with zinc anodes to produce electrical energy storage devices. These storage devices, variously known as redox capacitors, batteries, or BATCAP™ (a hybrid device which exhibits the characteristics of a battery and a capacitor), exhibit superior cycle life performance and power density compared to capacitors or batteries previously realized in the prior art. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrochemical energy storage device comprising two asymmetric electrodes and a gel electrolyte in contact with the two asymmetric electrodes, the gel electrolyte comprising a polymer matrix of polyvinyl alcohol or polyvinyl acetate, the polymer matrix having dispersed therein a metal hydroxide, and a metal porphine modifier.

2. The electrochemical energy storage device as described in claim 1, wherein the metal hydroxide is potassium hydroxide or sodium hydroxide.

3. The electrochemical energy storage device as described in claim 1, further comprising a metal porphine modifier in the gel electrolyte.

4. The electrochemical energy storage device as described in claim 1, wherein the metal porphine comprises iron porphine or nickel porphine.

5. The electrochemical energy storage device as described in claim 1, wherein the polymer matrix comprises about 0.5% to about 10% by weight, and the metal hydroxide comprises about 1% to about 25% by weight, and the metal porphine comprises about 1 to about 1000 parts per million.

6. The electrochemical energy storage device as described in claim 1, wherein the gel electrolyte is in the form of a film and is in direct contact with the two asymmetric electrodes.

7. The electrochemical energy storage device as described in claim 1, further comprising a separator disposed between the two asymmetric electrodes, and wherein the separator is impregnated with the gel electrolyte.

8. A rechargeable electrochemical cell comprising:
 a zinc anode;
 a cathode fabricated of materials selected from the group of silver or a nickel/molybdenum/chromium alloy; and
 a gel electrolyte in contact with said anode and said cathode, said gel electrolyte comprising a polymer matrix of poly(vinyl)alcohol or poly(vinyl)acetate, and having dispersed therein a metal hydroxide.

9. A rechargeable electrochemical cell as in claim 8, wherein the metal hydroxide is potassium hydroxide or sodium hydroxide.

10. A rechargeable electrochemical cell as in claim 8, further comprising a metal porphine modifier in the gel electrolyte.

11. A rechargeable electrochemical cell as in claim 10, wherein the metal porphine modifier comprises iron porphine or nickel porphine.

12. A rechargeable electrochemical cell as in claim 10, wherein the polymer matrix comprises about 0.5% to about 10% by weight, the metal hydroxide comprises about 1% to about 25% by weight, and the metal porphine comprises about 1 to about 1000 parts per million.

13. An electrochemical cell which stores charge via an oxidation/reduction charge storage mechanism, said electrochemical cell comprising first and second electrodes, at least one of which is fabricated of a nickel/molybdenum/chromium alloy; and a polymer gel electrolyte with, and disposed between, said first and second electrodes, said polymer gel electrolyte comprising a polymer matrix selected from the group of poly(vinyl)alcohol or poly(vinyl)acetate, the polymer matrix having dispersed therein a metal hydroxide selected from the group consisting of potassium hydroxide, sodium hydroxide, ammonium hydroxide, lithium hydroxide, cesium hydroxide, beryllium hydroxide, magnesium hydroxide, calcium hydroxide, and combinations thereof.

14. An electrochemical cell as in claim 13, wherein the metal hydroxide is potassium hydroxide or sodium hydroxide.

15. An electrochemical cell as in claim 13, further comprising a metal porphine modifier in the gel electrolyte.

16. An electrochemical cell as in claim 15, wherein the metal porphine modifier comprises iron porphine or nickel porphine.

17. An electrochemical cell as in claim 15, wherein the polymer matrix comprises about 0.5% to about 10% by weight, the metal hydroxide comprises about 1% to about 25% by weight, and the metal porphine comprises about 1 to about 1000 parts per million.

* * * * *